United States Patent [19]

Dean

[11] Patent Number: 4,568,722

[45] Date of Patent: Feb. 4, 1986

[54] POLYMER COMPOSITIONS CONTAINING STYRENE/CYANOSTYRENE COPOLYMERS

[75] Inventor: Barry D. Dean, Broomall, Pa.

[73] Assignee: Atlantic Richfield Company, Los Angeles, Calif.

[21] Appl. No.: 602,247

[22] Filed: Apr. 20, 1984

[51] Int. Cl.$^4$ .......................... C08L 9/00; C08L 9/06; C08L 25/08; C08L 25/18

[52] U.S. Cl. ...................................... 525/71; 525/73; 525/205

[58] Field of Search ........................... 525/73, 205, 71

[56] References Cited

U.S. PATENT DOCUMENTS

| | | | |
|---|---|---|---|
| 4,374,951 | 2/1983 | Lee et al. | 525/205 |
| 4,381,373 | 4/1983 | Ikuma | 525/205 |
| 4,408,010 | 10/1983 | Le-Khac | 525/73 |
| 4,451,617 | 5/1984 | Khac | 525/73 |
| 4,458,046 | 7/1984 | Hornbaker et al. | 525/73 |

*Primary Examiner*—Allan M. Lieberman
*Attorney, Agent, or Firm*—Dennis M. Kozak

[57] ABSTRACT

Polymer compositions comprising from about 1 to about 99 mole % of a copolymer of a styrenic monomer selected from the group consisting of styrene, p-methylstyrene, t-butylstyrene and α-methylstyrene with a maleimide monomer selected from the group consisting of maleimide, N-phenylmaleimide, N-methylmaleimide and N-ethylmaleimide and from about 99 to about 1 mole % of a copolymer of styrene monomer with at least one isomeric cyanostyrene monomer selected from the group consisting of ortho-cyanostyrene, meta-cyanostyrene and para-cyanostyrene, are disclosed.

12 Claims, No Drawings

POLYMER COMPOSITIONS CONTAINING STYRENE/CYANOSTYRENE COPOLYMERS

This invention relates to polymer compositions.

More specifically, this invention relates to polymer compositions which contain a copolymer of a styrenic monomer with a maleimide or an N-substituted maleimide monomer and a copolymer of styrene monomer with at least one isomeric cyanostyrene monomer.

In one of its preferred embodiments this invention pertains to thermodynamically miscible polymer compositions which contain a styrenic/N-substituted maleimide copolymer and a styrene/isomeric cyanostyrene copolymer.

The miscibility of polymers is generally determined using differential scanning calorimetry to measure glass transition temperature. A thermodynamically miscible polymer composition will exhibit a single glass transition temperature value which typically lies intermediate between the glass transition temperatures of the individual polymeric components. Correspondingly, a partially miscible or immiscible composition will exhibit two or more glass transition temperature values. Accordingly, two or more polymers are said to be thermodynamically miscible when the free energy of mixing is negative. And, thermodynamic miscibility is said to exist when a mixture of two or more polymers results in a material exhibiting a single, well defined glass transition temperature.

According to this invention there is provided a polymer composition comprising (A) from about 1 to about 99 mole % of a copolymer of from about 50 to about 80 mole % of recurring units of a styrenic monomer selected from the group consisting of styrene, p-methylstyrene, t-butylstyrene and α-methylstyrene and from about 50 to about 20 mole % of recurring units of a maleimide monomer selected from the group consisting of maleimide, N-phenylmaleimide, N-methylmaleimide and N-ethylmaleimide and (B) from about 99 to about 1 mole % of a copolymer of from about 90 to about 50 mole % recurring units of styrene monomer and from about 10 to about 50 mole % recurring units of at least one cyanostyrene monomer selected from the group consisting of ortho-cyanostyrene, meta-cyanostyrene and para-cyanostyrene.

In one preferred embodiment of this invention, (A) is a styrene/N-phenylmaleimide copolymer containing from about 50 to about 60 mole % recurring units of styrene and from about 50 to about 40 mole % recurring units of N-phenylmaleimide, and (B) is a styrene/isomeric cyanostyrene copolymer containing from about 55 to about 90 mole % recurring units of styrene and from about 45 to about 10 mole % recurring units of isomeric cyanostyrene comprised of from about 22 to 100 mole % para-cyanostyrene and 0 to about 78 mole % ortho-cyanostyrene; wherein (A) and (B) are thermodynamically miscible with one another and the polymer composition exhibits a single glass transition temperature value.

In another preferred embodiment of this invention, (A) is a styrene/N-methylmaleimide copolymer containing from about 50 to about 60 mole % recurring units of styrene and from about 50 to about 40 mole % N-methylmaleimide; and (B) is a styrene/isomeric cyanostyrene copolymer containing from about 60 to about 80 mole % recurring units of styrene and from about 40 to about 20 mole % recurring units of isomeric cyanostyrene comprised of from about 50 to 100 mole % recurring units of ortho-cyanostyrene and 0 to about 50 mole % recurring units of para-cyanostyrene; wherein (A) and (B) are thermodynamically miscible with one another and the polymer composition exhibits a single glass transition temperature value.

In another preferred embodiment of this invention, (A) is a styrene/N-ethylmaleimide copolymer containing from about 50 to about 60 mole % recurring units of styrene and from about 50 to about 40 mole % recurring units of N-ethylmaleimide; and (B) is a styrene/ortho-cyanostyrene copolymer containing from about 60 to about 80 mole % recurring units styrene and from about 40 to about 20 mole % recurring units of ortho-cyanostyrene, wherein (A) and (B) are thermodynamically miscible with one another and the polymer composition exhibits a single glass transition temperature value.

In yet another preferred embodiment, copolymer (B) may be modified by grafting it to an elastomer using any suitable method. Grafting of the styrene/cyanostyrene copolymer to an elastomer provides enhanced impact strength to the polymer composition.

Suitable elastomers include polybutadiene, ethylene/propylene/diene (EPDM) rubbers, butyl rubber, acrylate rubber, block copolymers of styrene-butadiene and the like.

Methods for grafting copolymers to elastomers are well known. See for example the method of Example I of U.S. Pat. No. 3,489,822 the teachings of which are incorporated herein by reference thereto.

In the practice of this invention it is preferred that the number average molecular weight of the styrenic/maleimide or N-substituted maleimide copolymer be within the range of from about 80,000 to about 200,000 and that the number average molecular weight of the styrene/cyanostyrene copolymer be from about 80,000 to about 200,000.

The polymer compositions of this invention are suitable for use as molding compounds which, typically, will contain other ingredients such as extenders, processing aids, stabilizers, pigments, mold release agents, anti-oxidants and the like, employed for their conventionally employed purpose. Also, reinforcing fillers in amounts sufficient to impart reinforcement can be incorporated, such as glass flakes and chopped glass fibers.

The polymer compositions and, accordingly, molding compounds incorporating those compositions may be prepared using any suitable method of blending. Preferably, the compositions are prepared by melt mixing at a temperature above the softening points of the copolymers using any conventional high shear melt mixing apparatus, including twin screw extruders, single screw extruders, and the like. The extrudate can be chopped into pellets and molded using any conventional method of molding including injection molding, roto-molding and the like. The word "molding" is meant to encompass all sheet and profile extrusion.

Reference is now made to the following examples which serve to demonstrate the invention.

EXAMPLES 1-6

The preparation of six different styrene/isomeric cyanostyrene copolymers was accomplished via suspension polymerization as follows.

A citrate bottle was charged with 100 grams of water; 1.2 grams tricalcium phosphate; 0.002 grams sodium bisulfite; 50 grams of total monomer selected to achieve the desired composition from styrene, p-cyano-styrene, and o-cyanostyrene 0.04 grams benzoylperoxide; and 0.095 grams t-butylperbenzoate. The bottle was capped and tumbled in an oil bath at 95° C. for 1.5 hours and then at 125° C. for 6 hours. The beads were recovered, acidified to a pH of about 1, filtered and dried.

All six styrene/isomeric cyanostyrene polymers were analyzed and %N, Mw, Mn, and Tg determined. The results are contained in following Table I.

TABLE I

| Example No. | Styrene/ Cyanostyrene[1] Copolymer | % N | Mole % Cyano-Styrene | MW[2] | Mn[2] | Tg (°C.)[3] |
|---|---|---|---|---|---|---|
| 1 | S/p-CNS | 1.4 | 10.9 | 202,300 | 105,200 | 118 |
| 2 | S/p-CNS | 3.0 | 23.5 | 197,600 | 100,100 | 122 |
| 3 | S/p-CNS | 5.1 | 41.6 | 183,300 | 97,200 | 125.5 |
| 4 | S/o,p-CNS[4] | 3.0 | 23.5 | 192,000 | 101,600 | 123.5 |
| 5 | S/o,p-CNS[5] | 2.9 | 22.7 | 187,200 | 97,600 | 127 |
| 6 | s/o-CNS | 2.9 | 22.7 | 199,200 | 108,100 | 132 |

[1]S = styrene, CNS = cyanostyrene, p = para, o = ortho and o,p = mixture of ortho and para
[2]Gel permeation chromotography analysis (polystrene standard)
[3]Differential scanning calorimetry
[4]ortho/para = 25:75
[5]ortho/para = 78:22

EXAMPLE 7-10

The preparation of four styrenic/maleimide or N-substituted maleimide copolymers was accomplished via suspension polymerization or solution polymerization as follows.

The charge of styrene to maleimide monomer in all four examples was 50:50 on a mole % basis.

Suspension polymerization was used to prepare the styrene/N-phenylmaleimide, styrene/N-methylmaleimide and styrene/N-ethylmaleimide copolymers.

Solution polymerization in methylethyl ketone was used to prepare the styrene/maleimide copolymer.

Following Table II characterizes the four copolymers prepared.

TABLE II

| Example No. | Maleimide[1] Copolymer | % N | Mole % Maleimide | MW[2] | Mn[2] | Tg (°C.)[3] |
|---|---|---|---|---|---|---|
| 7 | S/NPMI | 5.1 | 50 | 285,600 | 124,170 | 222 |
| 8 | S/MMI | 6.5 | 50 | 262,100 | 109,100 | 202 |
| 9 | S/EMI | 6.1 | 50 | 279,300 | 90,100 | 187 |
| 10 | S/MI | 6.9 | 50 | 301,500 | 143,570 | 235 |

[1]S = styrene; NPMI = N—phenylmaleimide; MMI = N—methylmaleimide; EMI = N—Ethylmaleimide; and MI = maleimide
[2]Gel Permeation Chromotography analysis (polystyrene standard)
[3]Differential scanning colorimetry

EXAMPLE 11

Solution blends of eighteen mixtures of the three styrenic/N-substituted maleimide copolymers (Examples 8-10) with the six styrene/isomeric cyanostyrene copolymers (Examples 1-6) were prepared.

All blends were prepared in tetrahydroduran followed by precipitation into methanol and drying in a vacuum oven. Blend miscibility and the thermal properties of selected blends are illustrated in Tables III and IV respectively. The number in parenthesis corresponds to the copolymers of Examples 1 to 10. All solution blends were 50/50 weight percent blends of the two copolymers.

TABLE III

| | Blend Miscibility | | | | | |
|---|---|---|---|---|---|---|
| | p-CNS (1) | p-CNS (2) | p-CNS (3) | o,p-CNS (4) | o,p-CNS (5) | o-CNS (6) |
| S/NPMI (7) | M | M | M | M | M | P |
| S/MMI (8) | P | P | P | P | M | M |
| S/EMI (9) | P | P | P | P | P | M |

(M) - total thermodynamic miscibility as indicated by a single glass transition temperature
(P) - partial thermodynamic miscibility or total immiscibility as indicated by two glass transition temperatures

TABLE IV

| | | Thermal Properties | | | |
|---|---|---|---|---|---|
| S/NPMI (7) | S/MMI (8) | p-CNS (1) (wt %) | o,p-CNS (5) | o-CNS (6) | DTUL (⅛" °F.) |
| 25 | — | 75 | — | — | 239 |
| 50 | — | 50 | — | — | 294 |
| 75 | — | 25 | — | — | 329 |
| 25 | — | — | 75 | — | 240 |
| — | 50 | — | 50 | — | 266 |
| 100 | — | — | — | — | 375 |
| — | 100 | — | — | — | 341 |
| — | — | 100 | — | — | 181 |
| — | — | — | 100 | — | 194 |
| — | — | — | — | 100 | 197 |

EXAMPLE 12

This example demonstrates the preparation of an EPDM-g-styrene/o,p-cyanostyrene copolymer suitable for use in the practice of this invention.

In a 4-liter resin kettle 400 grams of an ethylene/propylene/dicyclopentadiene rubber (Royalene ®306 EPDM, Uniroyal) containing 8.5 percent by weight of dicyclopentadiene termonomer were dissolved in 2500 grams of a solvent mixture comprised of 75 percent t-butylbenzene and 25% chlorobenzene. The EPDM rubber dissolved readily in two hours by heating the solution to 70° C. The resin kettle was charged with 120 grams of 40% anhydrous t-butyl-hydroperoxide in toluene solution (prepared by extraction of a 70% t-butyl-hydroperoxide water solution with toluene according to the procedure described by K.B. Sharpless, et al. *Journal of Organic Chemistry*, 1983, 48 3607). Immediately after the addition of the hydroperoxide solution, 24 grams of a 6% cobalt napthenate solution and 2.2 grams of cobalt (acetyl acetonate) were added. The reaction mixture was maintained at 70° C. for 24 hours. The EPDM rubber solution was precipitated into a threefold excess of methanol using a high speed Waring Blender for agitation. The EPDM rubber was dried in vacuo at 25° C. and then dissolved in toluene and precipitated into methanol a second time. The peroxidized EPDM rubber was dried in vacuo at 25° C. for 48 hours.

The level of active oxygen in the EPDM rubber was determined based on iodine liberation in a modification of method III as described by R.D. Mair and Alda J. Graupner; Analytical Chemistry, 1964, 36, 194. The active oxygen level was determined to be 1056 ppm.

About 50 g of the resulting peroxidized EPDM were dissolved in about 120 g of chlorobenzene. To the solution were added about 3.25 g o-cyanostyrene, about 9.75 g p-cyanostyrene and about 37 g of styrene. The mixture was heated to 140° C. for about 6 hours. The resulting product an EPDM-g-styrene/o,p-cyanostyrene copolymer was recovered by precipitation into methanol and drying in a vacuum oven. The level of grafting of the styrene/o,p-cyanostyrene copolymer to the EPDM was determined to be 52%. The composition of the styrene/o,p-cyanostyrene copolymer grafted to the EPDM was identical to the styrene/o,p-cyanostyrene copolymer produced in Example 5.

EXAMPLE 13

This example demonstrates the enhanced impact resistance of polymer compositions of this invention which incorporate a styrene/cyanostyrene copolymer highly grafted to an elastomer as compared to the same polymer compositions in which the styrene/cyanostyrene copolymer was not grafted to an elastomer. Four compositions (1–4) were prepared.

Composition 1 contained 50 mole % of the styrene/N-phenylmaleimide copolymer of Example 7 (50:50 mole %) and 50 mole % of the styrene/o,p-cyanostyrene copolymer of Example 5 (77.3:22.7 mole %).

Composition 2 contained 50 mole % of the styrene/N-phenylmaleimide copolymer of Example 7 and 50 mole % of the EPDM-g-styrene/o,p-cyanostyrene copolymer of Example 12.

Composition 3 contained 50 mole % of the styrene/N-methylmaleimide copolymer of Example 8 (50:50 mole %) and 50 mole % of the styrene/o,p-cyanostyrene copolymer of example 5.

Composition 4 contained 50 mole % of the styrene/N-methylmaleimide copolymer of Example 8 and 50 mole % of the EPDM-g-styrene/o,p-cyanostyrene copolymer of Example 12. The compositions, their heat distortion temperatures and impact properties are illustrated in following Table V.

TABLE V

| Copolymer of: | COMPOSITION | | | |
|---|---|---|---|---|
| | 1 | 2 | 3 | 4 |
| Example 7 (S/NPMI) | 50 | 50 | — | — |
| Example 8 (S/NMMI) | — | — | 50 | 50 |
| Example 5 (S/o,p-CNS) | 50 | — | 50 | — |
| Example 12 (EPDM-g-s/o,p-CNS) | — | 50 | — | 50 |
| % Rubber | — | 25 | — | 25 |
| Tg (°C., DSC) | 189 | 187 | 178.5 | 177 |
| DTUL (⅛", °F.) | 309 | 274 | 290 | 258 |
| Notched Izod (ft-lbs/in) | 0.4 | 3.9 | 0.5 | 3.7 |

It will be evident from the foregoing that various modifications can be made to this invention. Such, however, are considered as being within the scope of the invention.

What is claimed is:

1. A polymer composition comprising (A) from about 1 to about 99 mole % of a copolymer of from about 50 to about 80 mole % of recurring units of a styrenic monomer selected from the group consisting of styrene, p-methylstyrene, t-butylstyrene and α-methylstyrene and from about 50 to about 20 mole % of recurring units of a maleimide monomer selected from the group consisting of maleimide, N-phenylmaleimide, N-methylmaleimide and N-ethylmaleimide and (B) from about 99 to about 1 mole % of a copolymer of from about 90 to about 50 mole % recurring units of styrene monomer and from about 10 to about 50 mole % recurring units of at least one cyanostyrene monomer selected from the group consisting of ortho-cyanostyrene, meta-cyanostyrene and para-cyanostyrene.

2. The polymer composition of claim 1 in which (A) is a styrene/N-phenylmaleimide copolymer containing from about 50 to about 60 mole % recurring units of styrene and from about 50 to about 40 mole % recurring units of N-phenylmaleimide; and (B) is a styrene/isomeric cyanostyrene copolymer containing from about 55 to about 90 mole % recurring units of styrene and from about 45 to about 10 mole % recurring units of isomeric cyanostyrene comprised of from about 22 to 100 mole % para-cyanostyrene and 0 to about 78 mole % ortho-cyanostyrene; wherein (A) and (B) are thermodynamically miscible with one another and the polymer composition exhibits a single glass transition temperature value.

3. The polymer composition of claim 1 in which (A) is a styrene/N-methylmaleimide copolymer containing from about 50 to about 60 mole % recurring units of styrene and from about 50 to about 40 mole % N-methylmaleimide; and (B) is a styrene/isomeric cyanostyrene copolymer containing from about 60 to about 80 mole % recurring units of styrene and from about 40 to about 20 mole % recurring units of isomeric cyanostyrene comprising of from about 50 to 100 mole % recurring units of ortho-cyanostyrene and 0 to about 50 mole % recurring units of para-cyanostyrene; wherein (A) and (B) are thermodynamically miscible with one another and the polymer composition exhibits a single glass transition temperature value.

4. The polymer composition of claim 1 in which (A) is a styrene/N-ethylmaleimide copolymer containing from about 50 to about 60 mole % recurring units of styrene and from about 50 to about 40 mole % recurring units of N-ethylmaleimide; and (B) is a styrene/ortho-cyanostyrene copolymer containing from about 60 to about 80 mole % recurring units styrene and from about 40 to about 20 mole % recurring units of ortho-cyanostyrene, wherein (A) and (B) are thermodynamically miscible with one another and the polymer composition exhibits a single glass transition temperature value.

5. The polymer composition of claim 1 in which copolymer (B) is grafted to an elastomer selected from the group consisting of polybutadiene, ethylene/propylene/diene rubbers, butyl rubber, acrylate rubber and block copolymers of styrene-butadiene.

6. The polymer composition of claim 2 in which copolymer (B) is grafted to an elastomer selected from the group consisting of polybutadiene, ethylene/propylene/diene rubbers, butyl rubber, acrylate rubber and block copolymers of styrene-butadiene.

7. The polymer composition of claim 3 in which copolymer (B) is grafted to an elastomer selected from the group consisting of polybutadiene, ethylene/propylene/diene rubbers, butyl rubber, acrylate rubber and block copolymers of styrene-butadiene.

8. The polymer composition of claim 4 in which copolymer (B) is grafted to an elastomer selected from the group consisting of polybutadiene, ehtylene/propylene/diene rubbers, butyl rubber, acrylate rubber and block copolymers of styrene-butadiene.

9. The polymer composition of claim 1 in which compolymer (A) has a number average molecular weight within the range of from about 80,000 to about 200,000.

10. The polymer composition of claim 1 in which compolymer (B) has a number average molecular weight within the range of from about 80,000 to about 200,000.

11. A method of producing a molded composition which comprises forming a blend comprising (A) from about 1 to about 99 mole % of a copolymer of from about 50 to about 80 mole % of recurring units of a styrenic monomer selected from the group consisting of styrene, p-methylstyrene, t-butylstyrene and α-methylstyrene and from about 50 to about 20 mole % of recurring units of a maleimide monomer selected from the group consisting of maleimid, N-phenylmaleimide, N-methylmaleimide and N-ethylmaleimide and (B) from about 99 to about 1 mole % of a copolymer of from about 10 to about 50 mole % recurring units of styrene monomer and from about 90 to about 50 mole % recurring units of at least one cyanostyrene monomer selected from the group consisting of ortho-cyanostyrene, meta-cyanostyrene and para-cyanostyrene and molding the resulting blend.

12. The method of claim 11 in which said blend is molded in contact with a reinforcing filler.

* * * * *